UNITED STATES PATENT OFFICE.

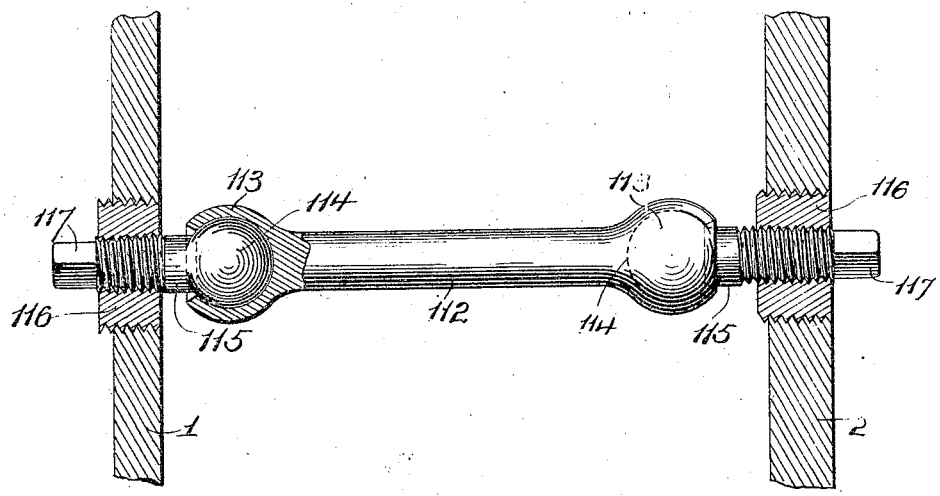

ETHAN I. DODDS, OF CENTRAL VALLEY, NEW YORK, ASSIGNOR, BY MESNE ASSIGNMENTS, TO FLANNERY BOLT COMPANY, OF PITTSBURGH, PENNSYLVANIA.

STAY-BOLT.

1,077,049.

Specification of Letters Patent. Patented Oct. 28, 1913.

Original application filed September 25, 1911, Serial No. 651,051. Divided and this application filed September 21, 1912. Serial No. 721,671.

*To all whom it may concern:*

Be it known that I, ETHAN I. DODDS, a citizen of the United States, residing at Central Valley, in the county of Orange and State of New York, have invented certain new and useful Improvements in Stay-Bolts; and I do hereby declare the following to be a full, clear, and exact description of the invention, such as will enable others skilled in the art to which it appertains to make and use the same.

This invention relates to flexible bolts such as are employed for connecting the outside and inside plates of locomotive and other boilers, and is a division of application Serial Number 651,051, filed September 25th, 1911.

The object of the invention is to provide an improved stay bolt capable of a universal angular movement or yield at or near both ends thereof, so that the stay-bolt will be relieved of any vibration due to the expansion of the fire-box and crown sheets, and permitting the sheets to expand and contract at will.

Another object of the invention is to provide a stay-bolt that can readily be applied from the inside without the trouble and expense of dismantling the engine, and can be adjusted at any time, if necessary.

The accompanying drawing is a view partly in longitudinal section and partly in elevation of a bolt embodying my invention. 1 and 2 represent respectively the outside and inside plates of that portion of a locomotive boiler embracing the fire box, and 112 is the bolt shank made from a drop forging. This shank is provided with hollow heads 113 which latter are swaged over the rounded heads 114 of the connectors 115 so as to form a ball and socket connection between the bolt shank and connectors. The connectors 115 have threaded engagement with the bushings 116 which in turn are threaded through the walls 1 and 2. The outer ends of the connectors are squared at 117 for adjusting and tensioning purposes. It is clearly evident that with this construction the bushing in the outer wall 1 may be dispensed with, in which event the outer wall 1 would have a threaded hole for engaging the shank of the connector.

Having fully described my invention what I claim as new and desire to secure by Letters-Patent, is:—

1. A stay bolt comprising connectors having rounded ends and threaded shanks, a threaded bushing on one of said threaded shanks, and a solid bolt shank having hollow heads swaged over the rounded ends of the connectors and forming ball and socket connection with said rounded ends.

2. A stay bolt comprising connectors having rounded ends and screw threaded shanks, threaded bushings on said shanks and a solid bolt shank having hollow heads swaged over the rounded ends of the connectors and forming ball and socket connection with said rounded ends.

In testimony whereof, I have signed this specification in the presence of two subscribing witnesses.

ETHAN I. DODDS.

Witnesses:
A. W. BRIGHT,
GEO. F. DOWNING.